(12) United States Patent
Wood

(10) Patent No.: US 9,921,891 B1
(45) Date of Patent: Mar. 20, 2018

(54) LOW LATENCY INTERCONNECT INTEGRATED EVENT HANDLING

(71) Applicant: Integrated Device Technology, Inc., San Jose, CA (US)

(72) Inventor: Barry Wood, Dunrobin (CA)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 261 days.

(21) Appl. No.: 14/675,498

(22) Filed: Mar. 31, 2015

(51) Int. Cl.
*G06F 13/24* (2006.01)
*G06F 9/54* (2006.01)
*G06F 9/48* (2006.01)

(52) U.S. Cl.
CPC ............ *G06F 9/542* (2013.01); *G06F 9/4812* (2013.01); *G06F 9/4881* (2013.01); *G06F 13/24* (2013.01); *G06F 2209/486* (2013.01); *G06F 2209/548* (2013.01)

(58) Field of Classification Search
CPC ....... G06F 9/4812; G06F 9/4881; G06F 13/24
USPC ......................................................... 710/263
See application file for complete search history.

(56) References Cited

U.S. PATENT DOCUMENTS

| | | | |
|---|---|---|---|
| 6,295,573 B1* | 9/2001 | Bailey | G06F 13/24 710/260 |
| 6,480,914 B1* | 11/2002 | Hsieh | G06F 13/105 710/15 |
| 6,499,078 B1* | 12/2002 | Beckert | G06F 13/26 710/260 |
| 2005/0144347 A1* | 6/2005 | Kitamura | G06F 9/4812 710/260 |
| 2007/0198759 A1* | 8/2007 | Agarwal | G06F 13/26 710/260 |
| 2007/0260796 A1* | 11/2007 | Grossman | G06F 13/24 710/269 |
| 2008/0109564 A1* | 5/2008 | Arndt | G06F 13/24 710/3 |
| 2010/0242041 A1* | 9/2010 | Plondke | G06F 9/3851 718/103 |
| 2011/0029101 A1* | 2/2011 | Castro Scorsi | G05B 19/4183 700/73 |
| 2011/0202699 A1* | 8/2011 | van Riel | G06F 9/4812 710/267 |
| 2012/0174098 A1* | 7/2012 | Tanikawa | G06F 9/4825 718/1 |
| 2012/0226842 A1* | 9/2012 | Evans | G06F 13/26 710/264 |
| 2013/0047157 A1* | 2/2013 | Suzuki | G06F 9/45533 718/1 |
| 2013/0179880 A1* | 7/2013 | Edholm | G06F 9/45558 718/1 |
| 2014/0122759 A1* | 5/2014 | Machnicki | G06F 13/24 710/261 |

* cited by examiner

*Primary Examiner* — Chun Kuan Lee
(74) *Attorney, Agent, or Firm* — Heimlich Law, PC; Alan Heimlich, Esq.

(57) ABSTRACT

Low Latency Interconnect Integrated Event Handling has been disclosed. In one implementation a hardware based interrupt controller coupled with a hardware based event queue manager, dedicated hardware based queues, and processor instruction extensions allows for off-loading event processing from an operating system thereby dramatically lowering wasted processor cycles while speeding up event processing.

12 Claims, 19 Drawing Sheets

US 9,921,891 B1

LOW LATENCY INTERCONNECT INTEGRATED EVENT HANDLING

FIELD OF THE INVENTION

The present invention pertains to event handling. More particularly, the present invention relates to a Low Latency Interconnect Integrated Event Handling.

BACKGROUND OF THE INVENTION

Currently handling events requires significant software processing that could instead be used to execute the application. This software processing also leads to wide variation in the latency of event handling.

FIG. 1 illustrates, generally at 100, a current version of an operating system handling an event. At 110 is a timeline for interconnect hardware, at 120 a timeline for the operating system (OS), and at 140 the timeline for the application. These timelines (110, 120, and 140) are all occurring concurrently at the same time (horizontally), with time progressing vertically from the top to the bottom of the page. So for example, the application is proceeding to execute, and at a point in time 142 the application finds it needs to wait on an event in order to continue the application, so the application contacts via 142 the operating system (OS) 120 which puts the application into a wait queue 122 where it sits. All these operations by the OS are performed by a processor that is not working on the application by rather managing the wait queue. At some point later in time interconnect hardware 120 signals an event via 112 to the OS. An event could be a "message", a distinct event, or an error condition. At that point in time 124 we interrupt the OS and pass the event to the handler process. At 126 the handler associates the correct event with application and then moves the application to the "Ready" queue for eventual processing. Some time then passes 128 until the scheduler runs. At 130 the scheduler chooses the application from Ready queue and via 132 the application resumes processing at 144.

FIG. 2 illustrates, generally at 200, a current version of an operating system showing three context switches 212, 234, 244, and an interrupt 227. At 202 is a timeline progressing from the left to the right. At 210 application A 210 is waiting on an event signaled via 212 to the kernel where at 214 the kernel adds the process to a queue and then schedules application B which is signaled via 216 to being application B processing 220. 212 indicates a context switch—that is switching from application A to application B. Application B 220 at some point is interrupted by an interrupt 222 which signal the kernel and at 224 the kernel adds the event to the processing queue and makes the event process "ready". That is application B was processing fine and was not waiting on any event but was rather interrupted and so it can proceed to execute without any dependencies and so is marked ready. At 226 when the interrupt processing is completed (return from interrupt), application B 220 continues execution. At 227 is indicated the interrupt sequence (start, processing, and return). Some time later application B 220 is either completed or is dependent on an event and so via 228 signals the kernel, and at 230 the kernel adds the process to a queue and schedules the events process. At 232 the kernel signal an events process which at 236 makes the application A ready to run, which is indicated via 238 to schedule application A 240. At 242 the schedule is activates and at 246 application A processes the event (which it was waiting on at 212). At 234 is indicated the second context switch, and at 244 the third context switch.

It is not uncommon for a processor to have thousands of events, or interrupts per second, and thus the operating system handling of events incurs a high processing cost, high latency, and an unpredictable latency.

This presents a technical problem for which a technical solution using a technical means is needed.

BRIEF DESCRIPTION OF THE DRAWINGS

The invention is illustrated by way of example and not limitation in the figures of the accompanying drawings.

DETAILED DESCRIPTION

Figure 1:
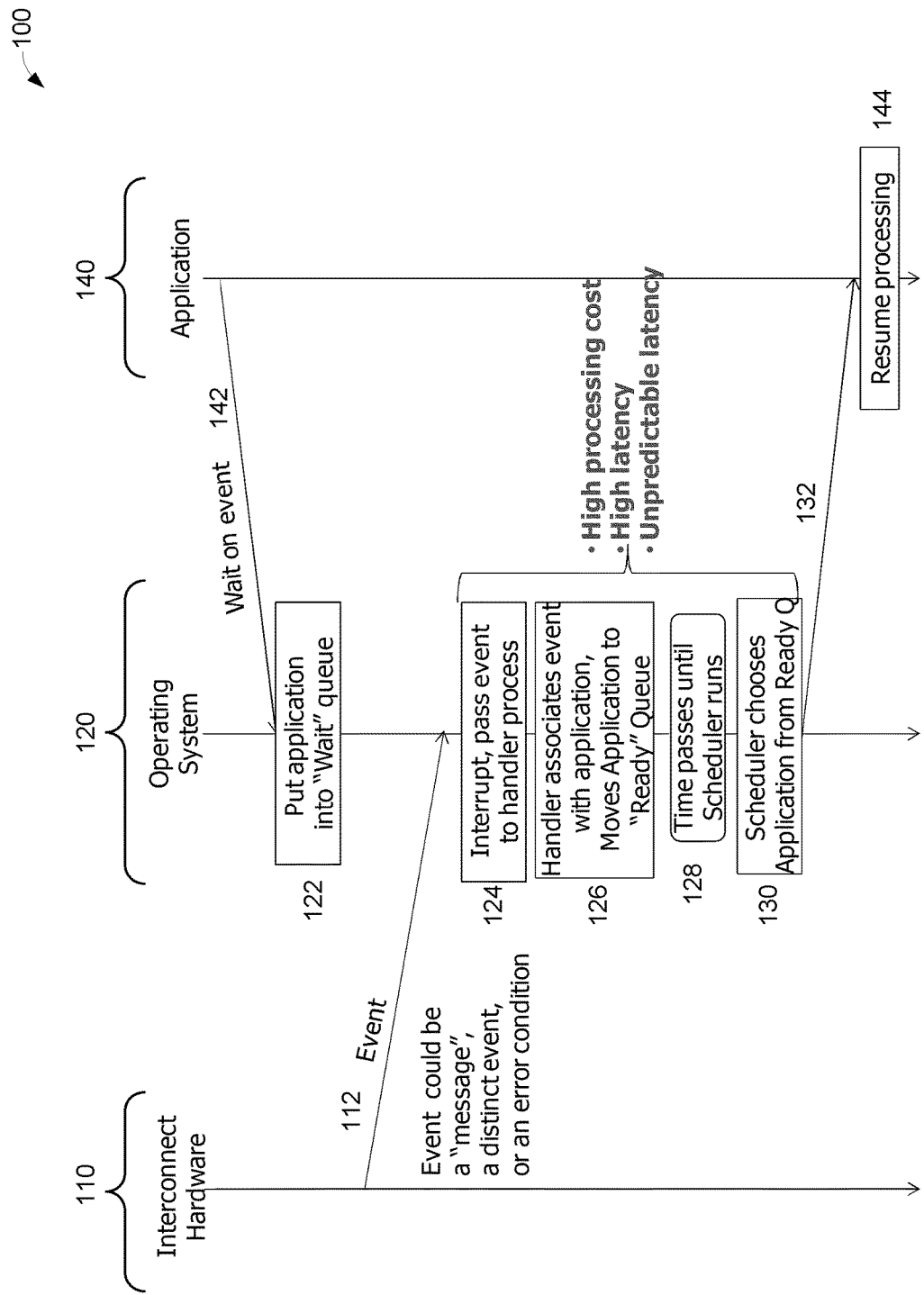
FIG. 1 illustrates a current version of an operating system handling an event.
Figure 2:
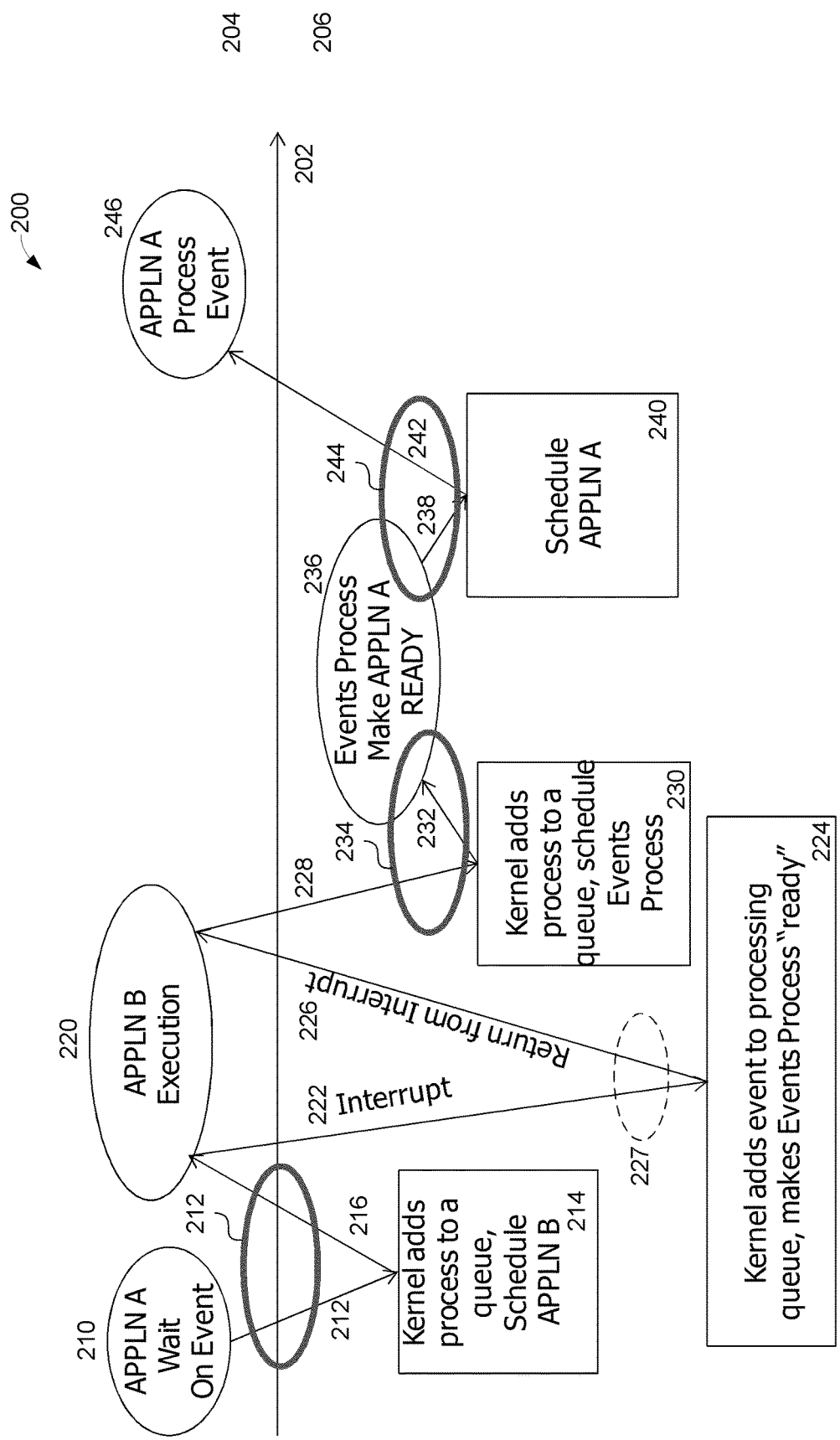
FIG. 2 illustrates a current version of an operating system showing three context switches, and an interrupt.

In one embodiment the invention provides event notification that is hidden from the processor.

In one embodiment of the invention events can be scheduled without the operating system.

In one embodiment of the invention latency for event handling becomes much more deterministic and more processor cycles can be used to do application work.

In one embodiment of the invention more processor cycles can be used to do application work.

In one embodiment of the invention event notification can be hidden from the processor, events can be scheduled without the operating system, the latency for event handling becomes much more deterministic and more processor cycles can be used to do application work.

In one embodiment the invention provides integration of processor instruction set, interrupt controller, and hardware queue management enables event handling without invoking the operating system.

In one embodiment the invention allows software execution to change from one process/thread to another process/thread without invoking the operating system.

In one embodiment the invention reduces event latency and increases system throughput.

In one embodiment of the invention by integrating a processor instruction set, an interrupt controller, and hardware queue management the embodiment enables event handling without invoking the operating system. This allows software execution to change from one process/thread to another process/thread without invoking the operating system. This reduces event latency and increases system throughput.

In one embodiment the invention integrates the operation of an interrupt controller, a queue manager, and the processor instruction set.

In one embodiment the invention the integrated interrupt controller (interrupt controller) tracks what events have occurred before a software entity was waiting, and which software entities are waiting for an event that has not yet occurred.

In one embodiment of the invention when an event occurs that a software entity was waiting for, the interrupt controller passes the software entity to a queue manager for scheduling.

In one embodiment of the invention the processor instruction set enables the processor to choose the next software entity to execute based on the state of the queues in the queue manager.

While embodiments of the invention will generally be described with respect to a single processor and illustrative operations, the invention is not so limited and there are numerous extensions to this basic operating model, including timeout support, support for simultaneously waiting for multiple events, and various schemes for hardware virtualization.

In one embodiment of the invention processor instructions are defined. However it is to be understood that depending upon which version of a processor has integrated thereon the present invention there may be additional processor instructions that are useful to particular applications/processor architectures. For example, but not limited to, an instruction extension may be for a multi-core processor to tell which of the cores are to power down. For example an additional power up/down instruction having a byte mask for each of 8 cores could be used to indicate a power down (bit=0) or power up (bit=1). Or an additional instruction to tell one or more cores at which clock speed to run (thus also saving power) (e.g. 2 bits per core to indicate 4 possible frequencies to operate at (e.g. power down (0 frequency), full frequency, ½ frequency, ¼ frequency)).

What is to be appreciated is that integration of the present techniques on the same IC as the processor affords the opportunity to add processor instructions that more fully and effectively make use of the techniques disclosed herein.

In one embodiment the invention relies on a processor instruction that allows swapping to a different application execution context without operating system intervention. This allows excellent event handling.

In one embodiment the invention provides for efficient interconnect event handling, reducing the impact of event handling by ~3 microseconds of time, and eliminating the execution of thousands of instructions within an operating system. It also has applicability to software inter-process communication efficiency, again eliminating thousands of instructions, reducing code size, and improving system efficiency.

Virtualized Hardware

Many interconnects support the concept of an "event queue" for an application. The "event queue" indicates that something has occurred that the application must deal with. The value of the "event queue" is that it makes applications much easier to implement. The processing cost of "event queues" is extremely high. This processing cost is because of, for example, interrupts, stacks, context switching which can take for example 2-3 µs of processor time, etc. The latency of delivering events to the application and the operating system queues is not deterministic, thus making real time system implementation difficult.

Figure 3:
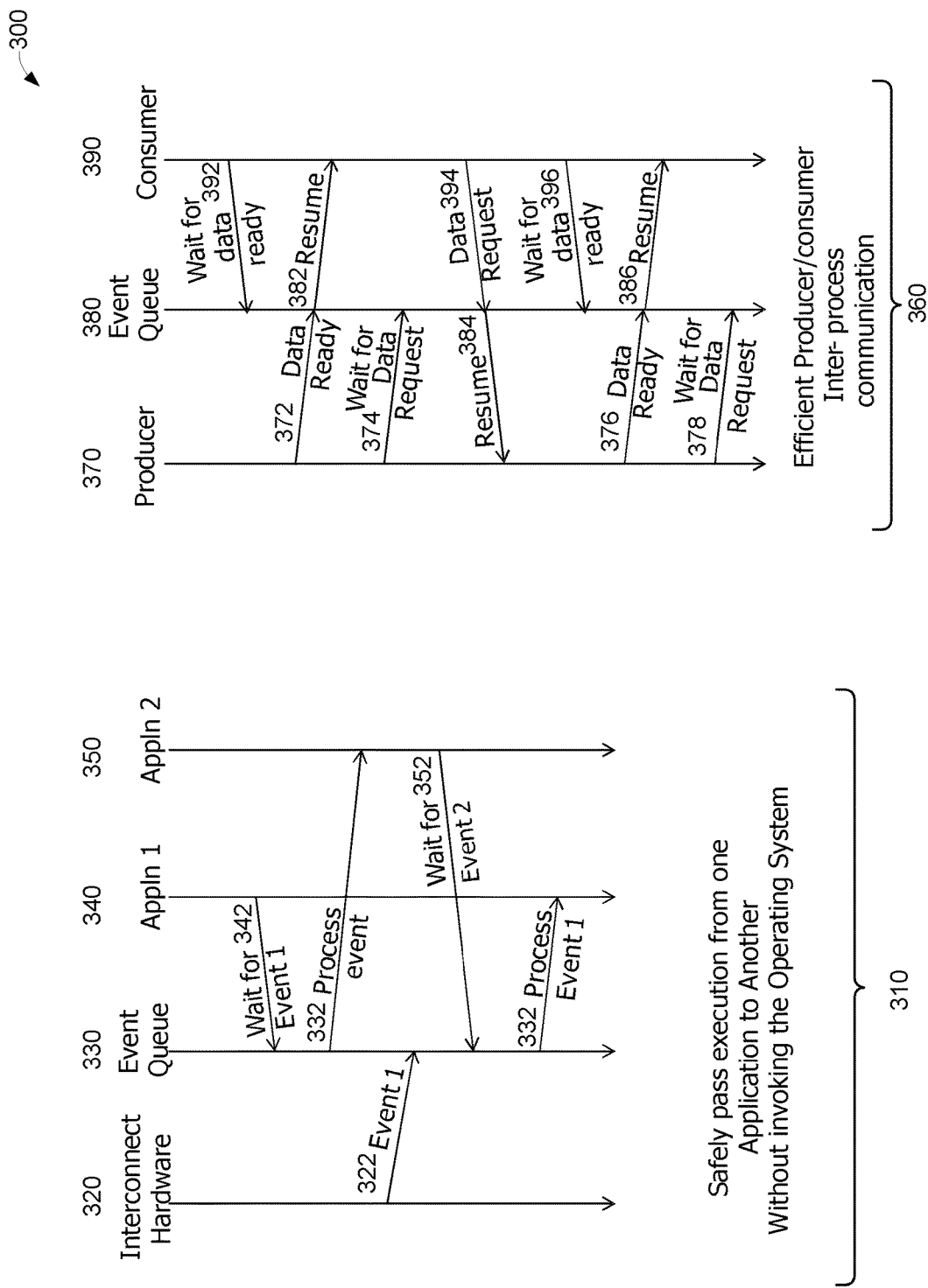
FIG. 3 illustrates various embodiments of the invention showing execution and communication.

FIG. 3 illustrates, generally at 300, various embodiments of the invention showing execution and communication. At 310 is shown safely passing execution from one application to another application without invoking the Operating System. At 360 is shown an efficient producer/consumer inter-process communication.

At 310, timelines 320, 330, 340, and 350 show respectively timelines for interconnect hardware, even queue, application 1, and application 2. Application 1 at time 342 need to wait for event 1 and signals such to event queue 330, which at time 332 processes events and signals application 2 350 to start. While application 2 350 is processing at 320 interconnect hardware at time 322 event 1 comes in and signals the event queue 330. Application 2 350 which was running now at 352 needs to wait for event 2 which is signaled to the event queue 330. The event queue now knowing that event 1 is available for waiting application 1 340, signals via 332 for application 1 to begin processing. Thus in one embodiment of the invention 310 is shown safely passing execution from one application to another application without invoking the operating system.

At 360, timelines 370, 380, and 359 show respectively timelines for producer, event queue, and consumer. Here consume 390 is executing and at 392 must wait for data ready which is signaled to event queue 380. Producer 370 at 372 indicates the data is ready to the event queue 380, and at 382 the event queue 380 resumes via 382 the consumer. At 374 producer 370 is waiting for a data request and signals such to the event queue 380. Meanwhile consumer 390 continues to execute until at 394 it indicates a data request to event queue 380, which is immediately resumed (passed) at 384 to producer 370. Next the consumer 390 at 390 signals the event queue 380 it's waiting for data ready. Producer 370 at time 375 indicates to the event queue 380 that data is ready which the event queue 380 vias sign 386 tells the consumer 390 to resume execution. Processing continues and the producer 370 at time 378 informs the event queue that it is waiting for a data request. Thus in one embodiment of the invention 360 is shown an efficient producer/consumer inter-process communication (IPC).

Figure 4:
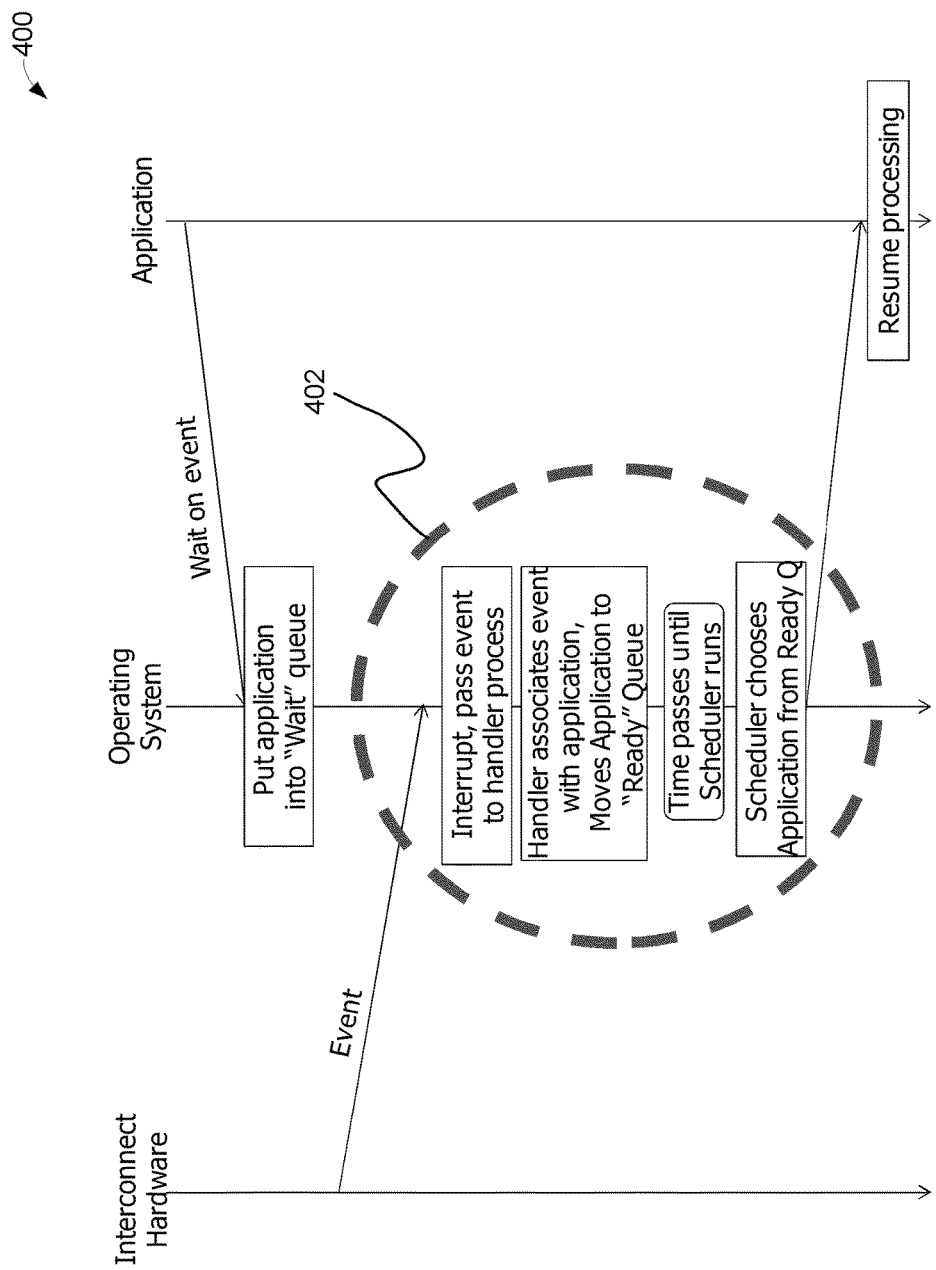
FIG. 4 illustrates where various embodiments of the invention replace/supplement traditional OS functions.

FIG. 4 illustrates, generally at 400, showing at 402 where various embodiments of the invention replace/supplement traditional OS functions. In one embodiment the operations within 402 are implemented in hardware, integrated with the processor (running the OS), and are the same integrated circuit as the processor. In this way efficient and faster event handling is possible because the operating system is relieved of many processing chores.

By implementing event handling in hardware context switching and inter-process communication is dramatically sped up.

Figure 5:
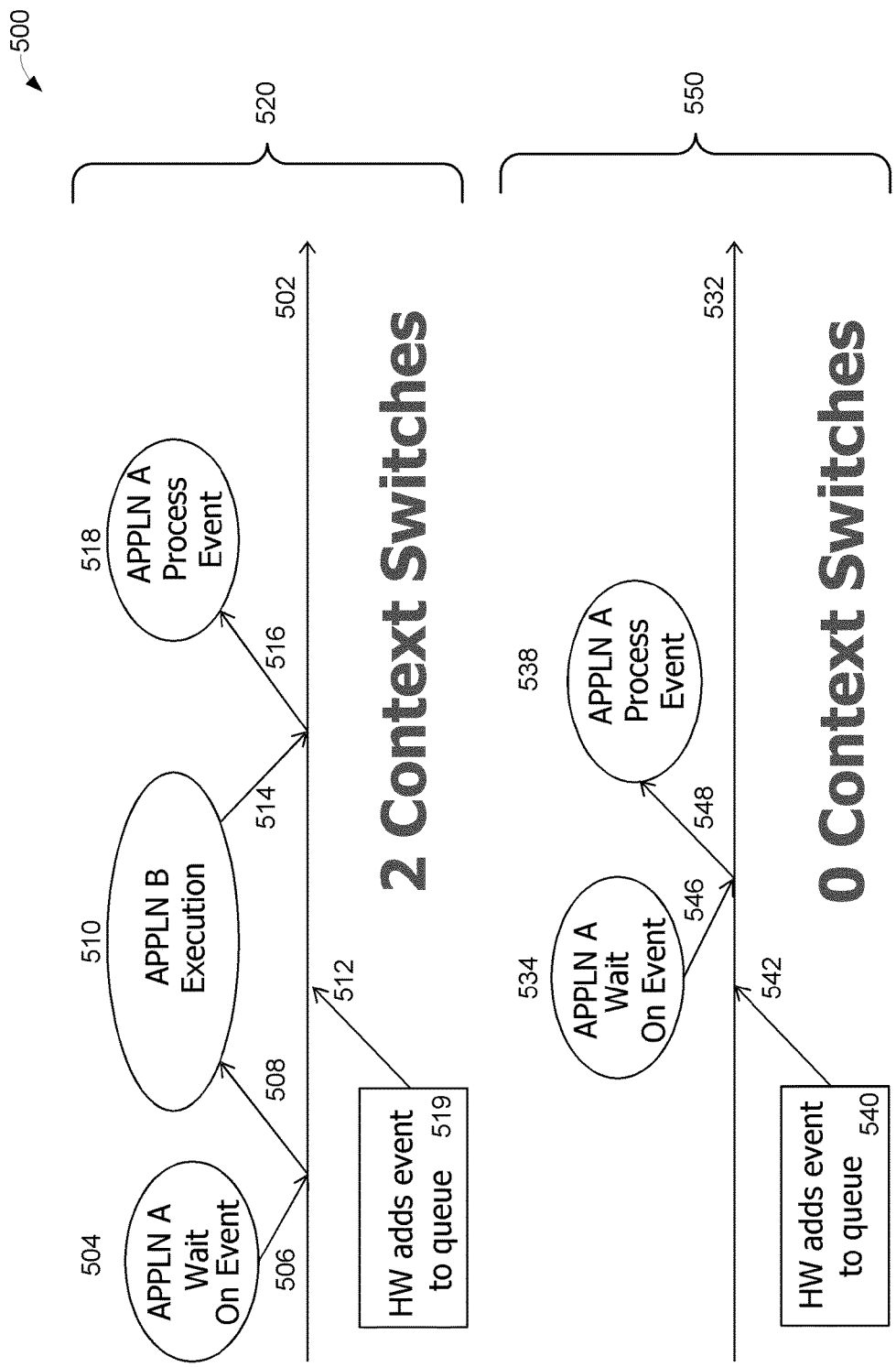
FIG. 5 illustrates various embodiments showing improved context handling.

FIG. 5 illustrates, generally at 500, various embodiments showing improved context handling. At 502 is a timeline indicator. At 520 is a situation where application A is waiting on an event so at 506 it signals such and because the event is not ready at 508 application B 510 starts immediately. While application B 510 is executing the hardware 519 adds an event to the queue as shown at 512. Some time later application B cannot continue and at 514 it signals such. In this embodiment immediately after receiving 514, signal 516 is issued which causes application A 518 to process the event. In this example 520 there were 2 context switches, one at 506-508, and the other at 514-516.

At 550 is a situation where hardware 540 adds an event to the queue as shown at 542. Sometime later application A 534 signals via 546 that it is waiting on an event and in this embodiment immediately after receiving 546, signal 548 is issued which causes application A 538 to process the event. In this example 550 there were 0 context switches because noting was switched in/out of processing. That is application A 534 immediately proceeded to process the event.

Figure 6:
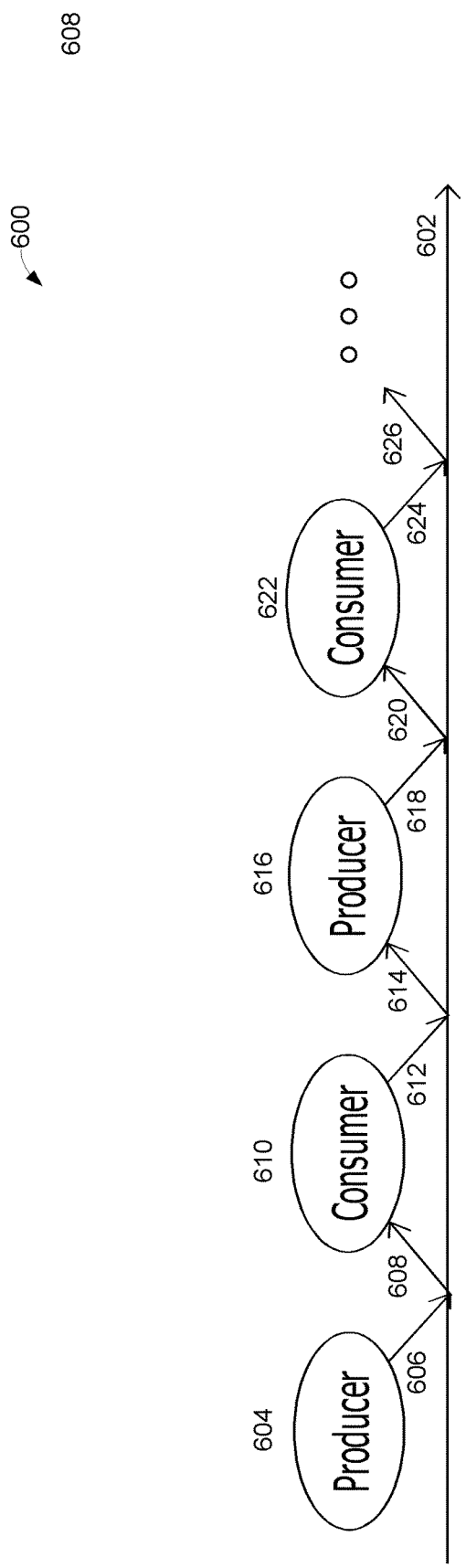
FIG. 6 illustrates one embodiment showing deterministic inter-process communication.

FIG. 6 illustrates, generally at 600, one embodiment showing deterministic inter-process communication. This diagram shows the common "ping pong" communication between a producer and a consumer. At 604, the Consumer 610 has waited on a "data ready" event. At 606 the Producer issues a data ready event and waits on a "need more data" event. After a single context switch 608 the Consumer 610 immediately begins processing the data. Once complete, the Consumer 610 issues a "need more data" event 612 and waits for a "data ready" event. After a single context switch 614 the Producer 616 resumes creating data. It is easy to see how the invention ensures inter process communication proceeds quickly and deterministically without operating system intervention. This process continues with 618 data ready, context switch 620, consumer 622, data request 624, context switch 626, etc.

Hardware Event Handling

In one embodiment of the invention applications receive events without Operating System intervention. For this to work the present invention integrates an interrupt controller, Operating System queues, and a CPU instruction set to pass events in hardware. That is the OS is not involved. The benefit of this embodiment is that it reduces CPU cycles spent on operating system operations, it preserves/strengthens the system security model, and has predictable, hard real time scheduling. That is in one embodiment, for example, the embodiment hardware has on-chip resources to take over the processor on-chip registers, the stack, and the program counter, and has on-chip resources for handling queues as the operating system might handle. In this way context switching in hardware is possible. Embodiments of the invention may be viewed as processor extensions to the point of handling interrupt, context switching, and queues that the OS previously handled. To integrate this smoothly with existing operating systems, it is advisable to add instructions to the processor instruction set.

Processor Instruction Set: WNE

In one embodiment of the invention an instruction added is "Wait for Next Event" (WNE).
WNE accepts parameters/configuration for Next Event in the processor registers.

In one embodiment of the invention, WNE has the following behavior:
  WNE queries the interrupt controller for Next Event
  if Next Event is pending then it:
    returns the event state in registers, and
    continues processing,
    if Next Event is not pending then it:
    saves the process state and waits for Next Event,
    queries the event queue manager for New Event, and
    resumes processing for New Event.
N.B. Next Event and New Event are not the same.

Processor Instruction Set: HANDOFF

In one embodiment of the invention an instruction added is "HANDOFF". HANDOFF accepts parameters/configuration for Event in the processor registers.

In one embodiment of the invention, HANDOFF has the following behavior:
  HANDOFF tells the interrupt controller that Event has occurred
  if waiting software exists for Event then it:
    saves the software state and adds it to Operating System queue, and
    resumes execution of waiting software immediately,
  If waiting software does not exist for Event then it:
    increments the Event count, and
    continues software execution.
In one embodiment of the invention HANDOFF can be invoked by a software event.

Processor Instruction Set: HANDOFF WNE

In one embodiment of the invention an instruction added is "HANDOFF and Wait for Next Event" instruction. "HANDOFF and Wait for Next Event" instruction accepts 1) parameters/configuration for EVENT and Next Event in processor registers, and 2) returns values for Next Event in the processor registers.

In one embodiment of the invention, HANDOFF and Wait for Next Event has the following behavior:
  It tells the interrupt controller that Event has occurred, and
  resumes the process when Next Event has occurred.
  It saves the software state and waits for Next Event,
  if waiting software exists for Event then it:
  resumes execution of waiting software immediately,
  if waiting software does not exist for Event, then
  increment Event count, and
  process as per WNE instruction.

Hardware Event Handling

Figure 7:
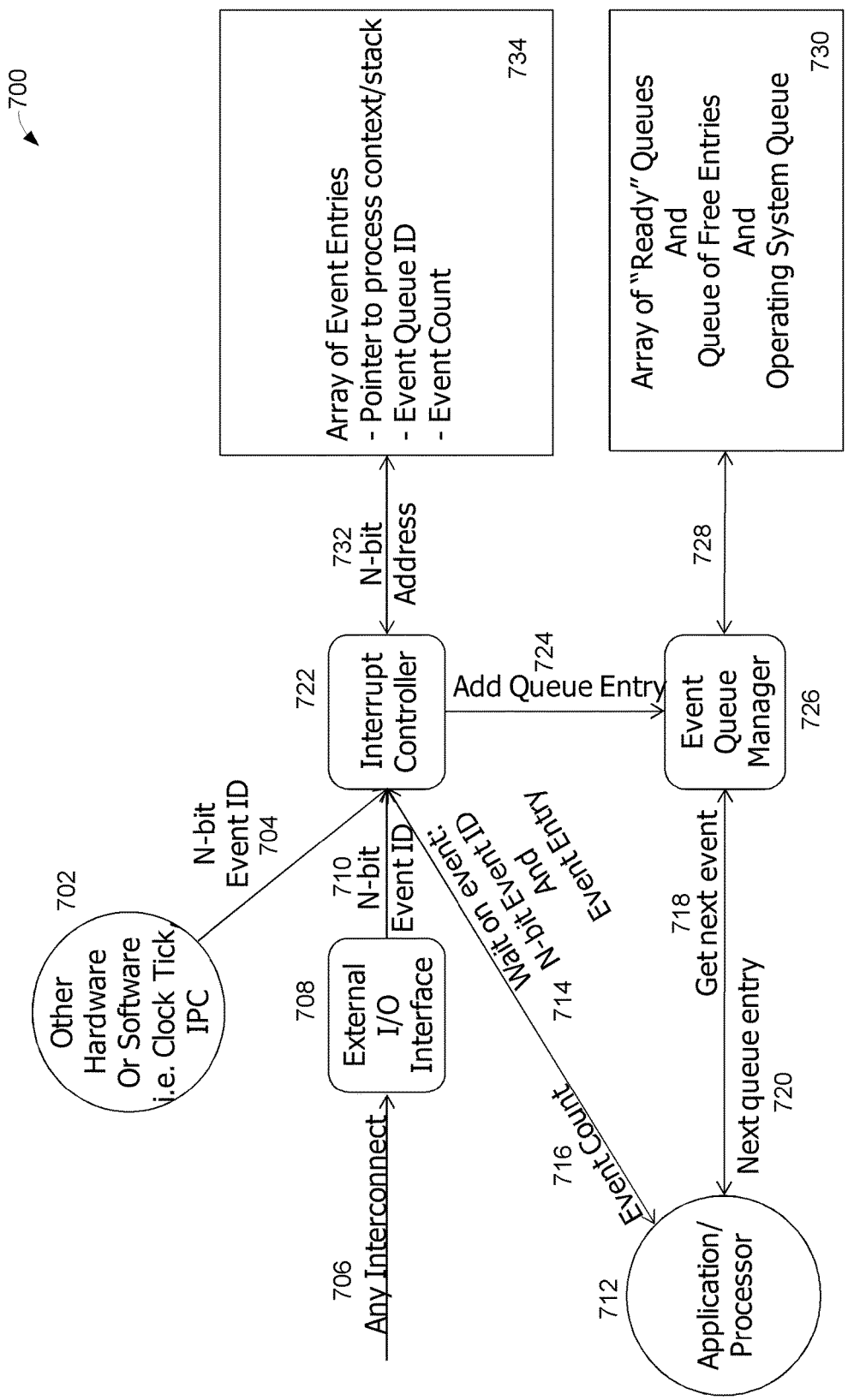
FIG. 7 illustrates one embodiment of the invention showing hardware based event handling.

FIG. 7 illustrates, generally at 700, one embodiment of the invention showing hardware based event handling. As noted earlier there may be thousands of different events occurring during a same time period. For purposes of illustration it is to be understood that reference to an N-bit Event ID is with respect to the "generating" or "receiving" entity that is handling a particular Event and that there is a respective number for the ID thereby identifying that particular event. That is, for example, the N-bit Event ID at 704, and the N-bit Event ID at 710 are most likely associated with different events and will have different values for the ID, however for illustration purposes we refer to each as having a N-bit Event ID. Thus while the label "N-bit Event ID" is used on both they are not necessarily the same but rather have their own respective values for identification. In one embodiment the ID in an N-bit Event ID can consist of a fixed width word (e.g. N-bits) that uses bits within the word to create the ID for the Event.

In FIG. 7 at 702 is a generating source, such as illustrated, Other Hardware Or Software i.e. Clock Tick, IPC (inter-process communication) which generates at 704 an N-bit Event ID that is communicated to Interrupt Controller 722. At 706 is another source, such as illustrated at 706 Any Interconnect which goes to an External I/O Interface 708, (I/O denotes Input/Output) which generates an N-bit Event ID 710 that is communicated to Interrupt Controller 722. At 712 is an Application/Processor, that is, an application, or a processor. When Application/Processor 712 is sending (i.e. initiating) a communication to the Interrupt Controller 722 it is as denoted at 714 Wait on event: N-bit Event ID And Event Entry. When Application/Processor 712 is receiving a communication from the Interrupt Controller 722 it is denoted at 716 and is an Event Count. That is the Interrupt Controller 722 can communicate to the Application/Processor 712 an Event Count 716. Application/Processor 712 can also communicate to Event Queue Manager 726 a Get next event 718. Similarly, Event Queue Manager 726 can communicate to Application/Processor 712 a Next queue entry 720. Interrupt Controller 722 can communicate to Event Queue Manager 726 an Add Queue Entry 724. Interrupt Controller 722 is in communication via an N-bit Address 732 with an Array of Event Entries 734. The Array of Event Entries 734 includes for example, a Pointer to process context/stack, an Event Queue ID, and an Event Count. Event Queue Manager 726 is in communication via 728 with block 730 which includes an Array of "Ready" Queues And Queue of Free Entries And Operating System Queue.

In one embodiment of the invention, for example, as illustrated at FIG. 7, the Operating System Queue at 730 manages suspended processes that are not waiting for events. That is, for example, if there are no events for which an application is waiting then trap to the OS (i.e. hardware event handling is not needed (i.e. no events)).

Interrupt Controller Operation

Figure 8:
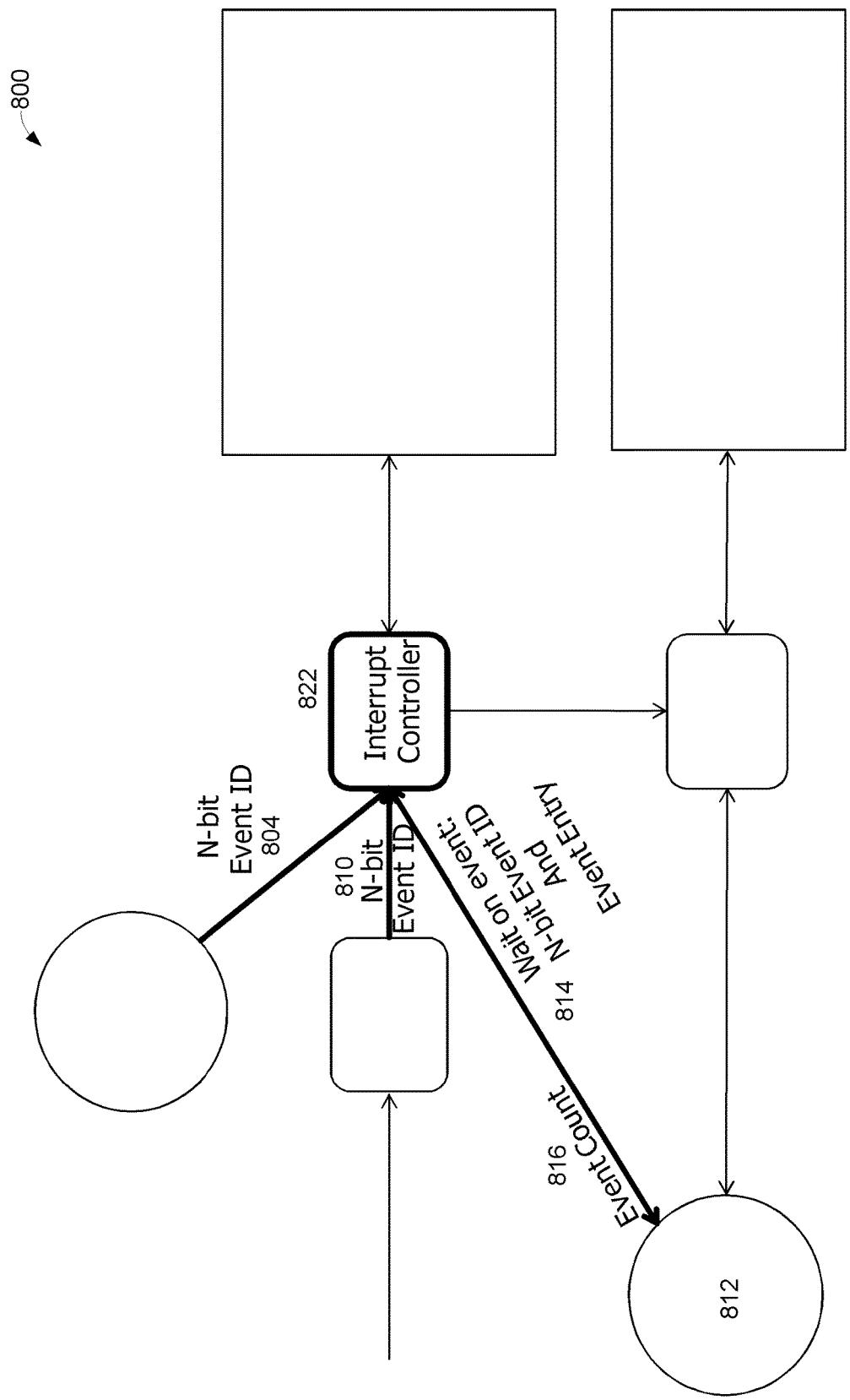
FIG. 8 illustrates one embodiment of the invention detailing Interrupt Controller operation.

FIG. 8 illustrates, generally at 800, one embodiment of the invention similar to FIG. 7, however detailing Interrupt Controller 822 operation. At 804 is an N-bit Event ID, at 812 an Application/Processor, at 814 Wait on event: N-bit Event ID And Event Entry, at 816 Event Count, and at 822 Interrupt Controller. Here, at 804 and 810 are an Event. For these inputs the Interrupt Controller 822 performs "Event Handling". Here at 814, and 816 are communications with an Application/Processor. For these the Interrupt Controller 822 performs "Wait for Event" processing.

"Event Handling" is:
(a) Suspend "Wait for Event" processing
(b) Accept event ID, read event entry
(c) If software is waiting for event entry then:
(c1) Clear event entry
(c2) Send event entry to Event Queue Manager
(d) If software is not waiting for event entry then:
(d1) Count events
(d1a) Increment event entry count
(e) Otherwise, discard event
(f) Resume "Wait for Event" processing.
"Wait for Event" processing is:
(a) If event count >0 then:
(a1) Return event entry
(a2) do not do "context switch", and
(a3) continue processing,
(b) If event count==0 then:
(b1) Pause Event Handling
(b2) Save state to memory
(b3) Write event entry, and
(b4) Resume Event Handling While one embodiment of "Event Handling" has been illustrated, the invention is not so limited and other embodiments are possible, for example, but not limited to, setting a threshold count for Event Handling.

While one embodiment of "Wait for Event" processing has been illustrated, the invention is not so limited and other embodiments are possible, for example, but not limited to steps (a) through (a3) as a group being optional.

Event Queue Manager

Figure 9:
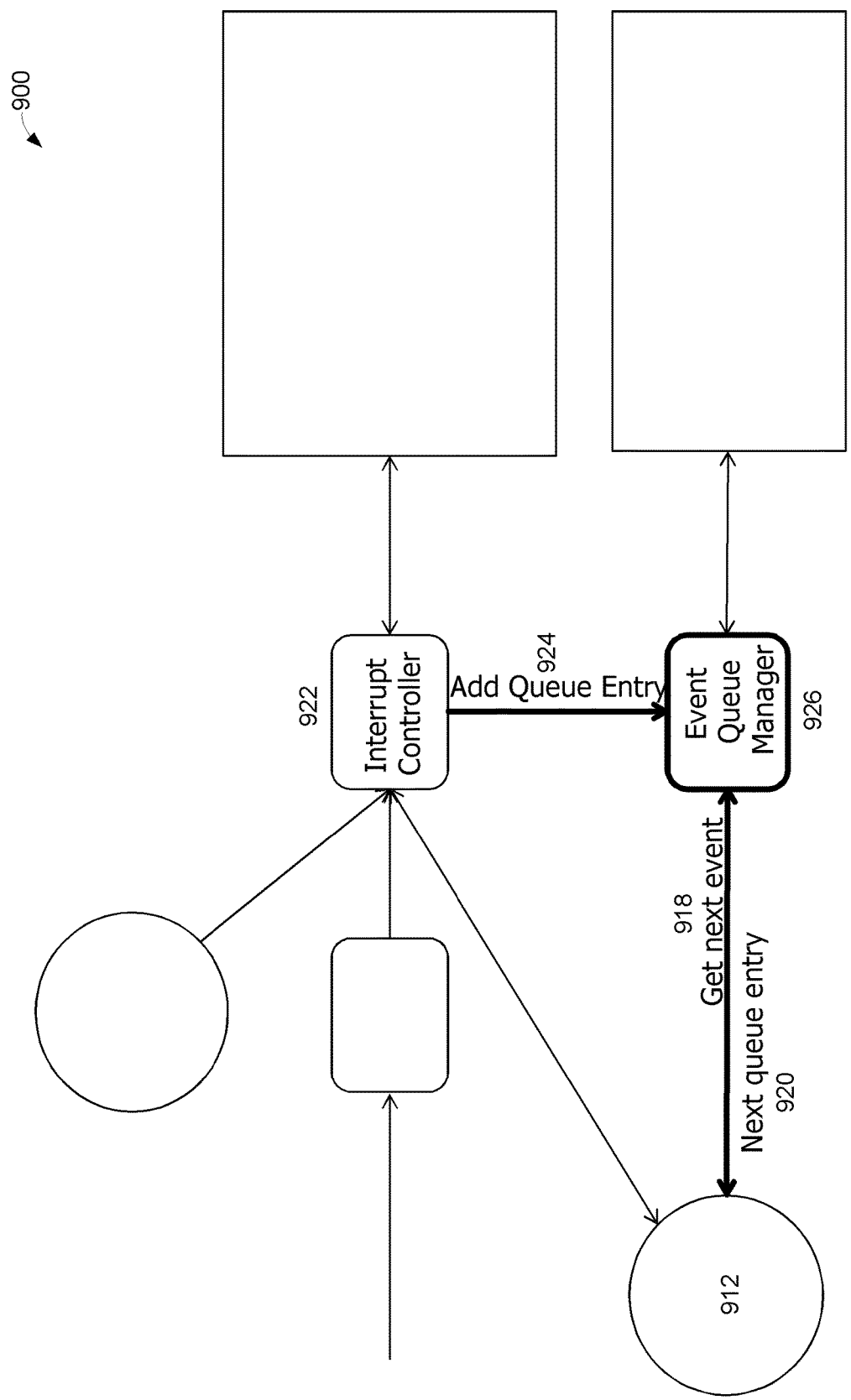
FIG. 9 illustrates one embodiment of the invention detailing Event Queue Manager operation.

FIG. 9 illustrates, generally at 900, one embodiment of the invention similar to FIG. 7, however detailing Event Queue Manager 926 operation. At 922 is Interrupt Controller, at 924 Add Queue Entry, at 926 Event Queue Manager, at 912 an Application/Processor, at 918 a Get next event, and at 920 a Next queue entry.

Here, at 924 is Add Queue Entry. For this input the Event Queue Manager 926 performs "Add Queue Entry". Here at 918, and 920 are communications with an Application/Processor 912. For these the Event Queue Manager 926 performs "Get Next Event" processing.

"Add Queue Entry" is:
(a) Get free queue entry,
(b) Add queue entry to selected queue,
(c) Add to head,
(d) Add to tail, and
(e) Load balance among set of queues Detailed queue management is not discussed here to avoid obscuring the present invention and because such things as head and tail management of pointers in queues is understood by one of skill in the art in software and is not germane to understanding the present invention other than the performance of these functions in hardware.

While an embodiment of "Add Queue Entry" has been detailed above, the invention is not so limited and other handling options are also possible, for example, but not limited to, delete queue entry, get queue metadata, etc.

Figure 10:
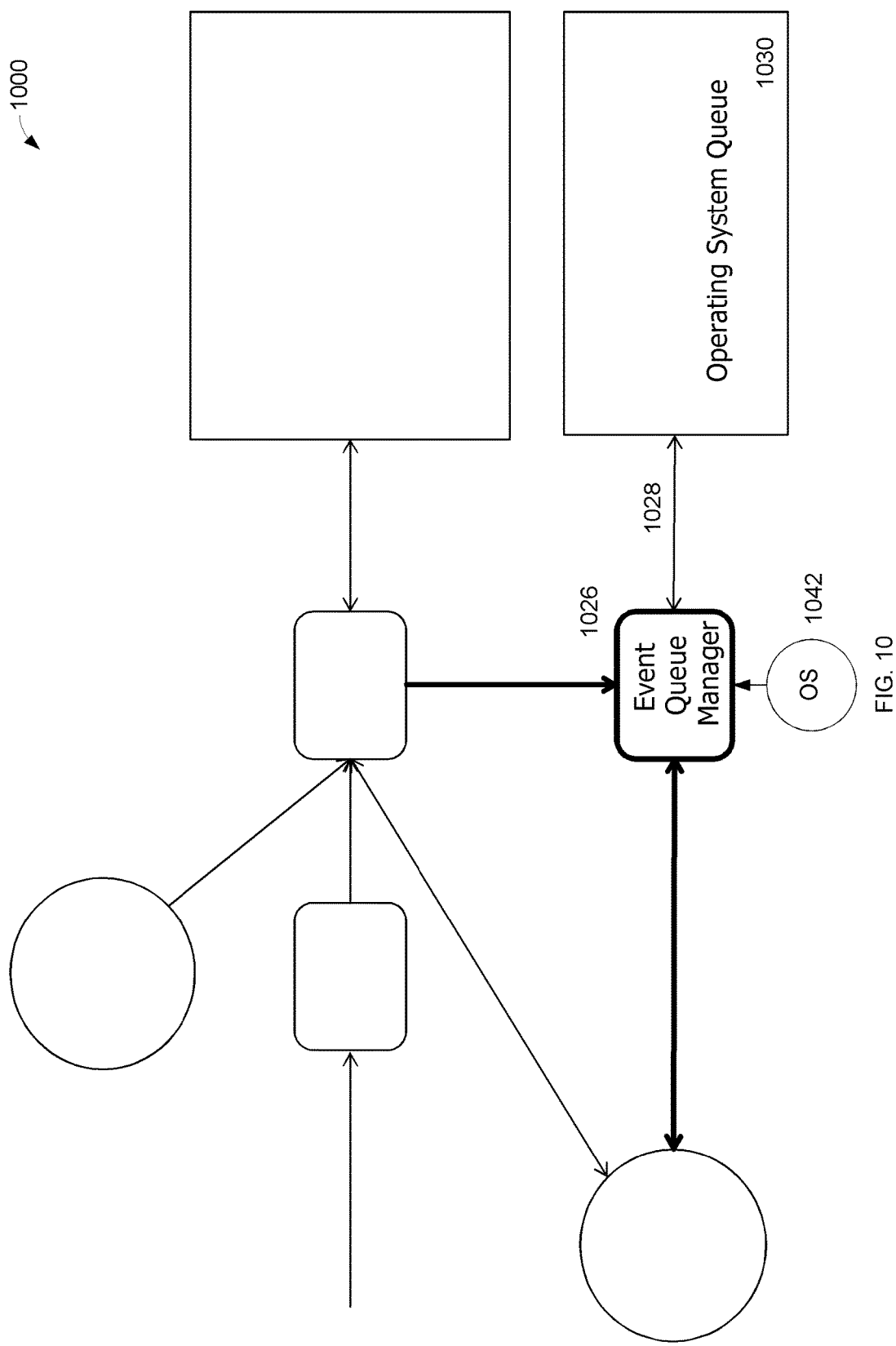
FIG. 10 illustrates one embodiment of the invention showing in more detail how operating system queues are handled.

"Get Next Event" is:

The Event Queue Manager can support various scheduling algorithms for getting the next event, these include, but are not limited to:

Head/tail of highest "priority" queue
Range of queues to select from
Round robin among groups of queues
"Trust" level of requestor (kernel Q's)
Regardless of the scheduling algorithm used, the Get Next Event
Returns
(a) If event is waiting then:
(a1) Return pointer to context of software waiting for the event
(b) If no event is waiting
(b1) Returns trap to the operating system scheduler
(c) Processor begins processing event/running scheduler.
Event Queue Manager: Operating System Queues FIG. 10 illustrates, generally at 1000, one embodiment of the invention similar to FIG. 9, however showing in more detail how operating system queues are handled. As noted Event Queue Manager 1026 can communicate via 1028 to interact with block 1030 having Operating System Queue, at 1042 is the OS interacting with Event Queue Manager 1026. In one embodiment of the invention, the Operating System 1042 takes over the Operating System Queue entries at 1030. In one embodiment of the invention Operating System Queue entries at 1030 can be resumed at the start of instructions after the HANDOFF.

As previously disclosed embodiments of the present invention allows for predictable real time behavior. In real time systems a clock tick is often used to effect real time performance. Accordingly, embodiments of the present invention are discussed below with respect to TimeOuts (as a result of, for example, a clock tick, etc.).

TimeOuts

Figure 11:
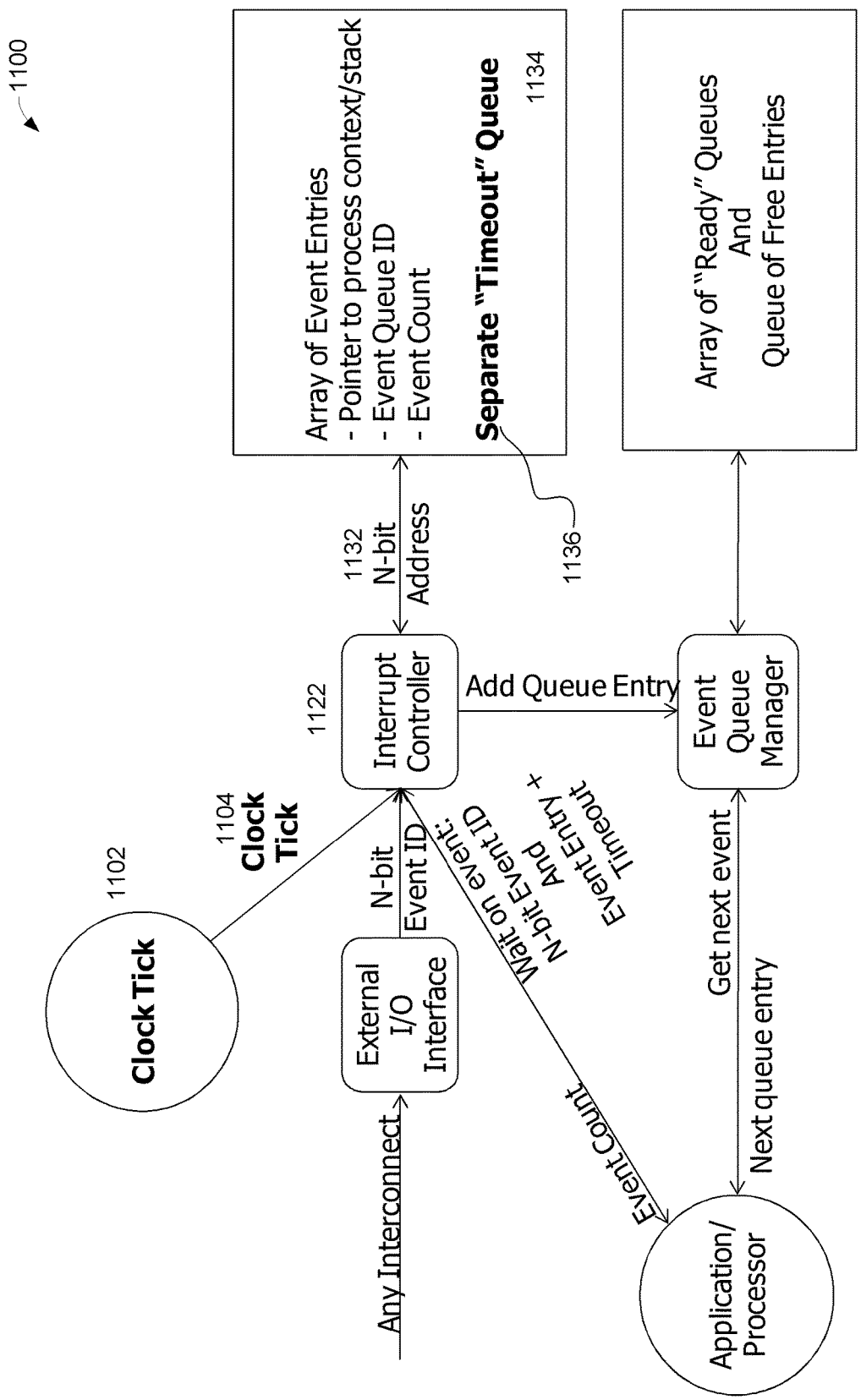
FIG. 11 illustrates one embodiment of the invention detailing timeouts.

FIG. 11 illustrates, generally at 1100, one embodiment of the invention similar to FIG. 7, however detailing timeouts. At 1102 is a Clock Tick which is communicated via 1104 to Interrupt Controller 1122. Because this is a timeout Interrupt Controller 1122 communicates via N-bit Address 1132 to block 1134 which has as a dedicated Separate "Timeout" Queue 1136. This dedicated queue and hardware implementation ensures correct real time behavior.

Interrupt Controller Operation: Timeouts

Figure 12:
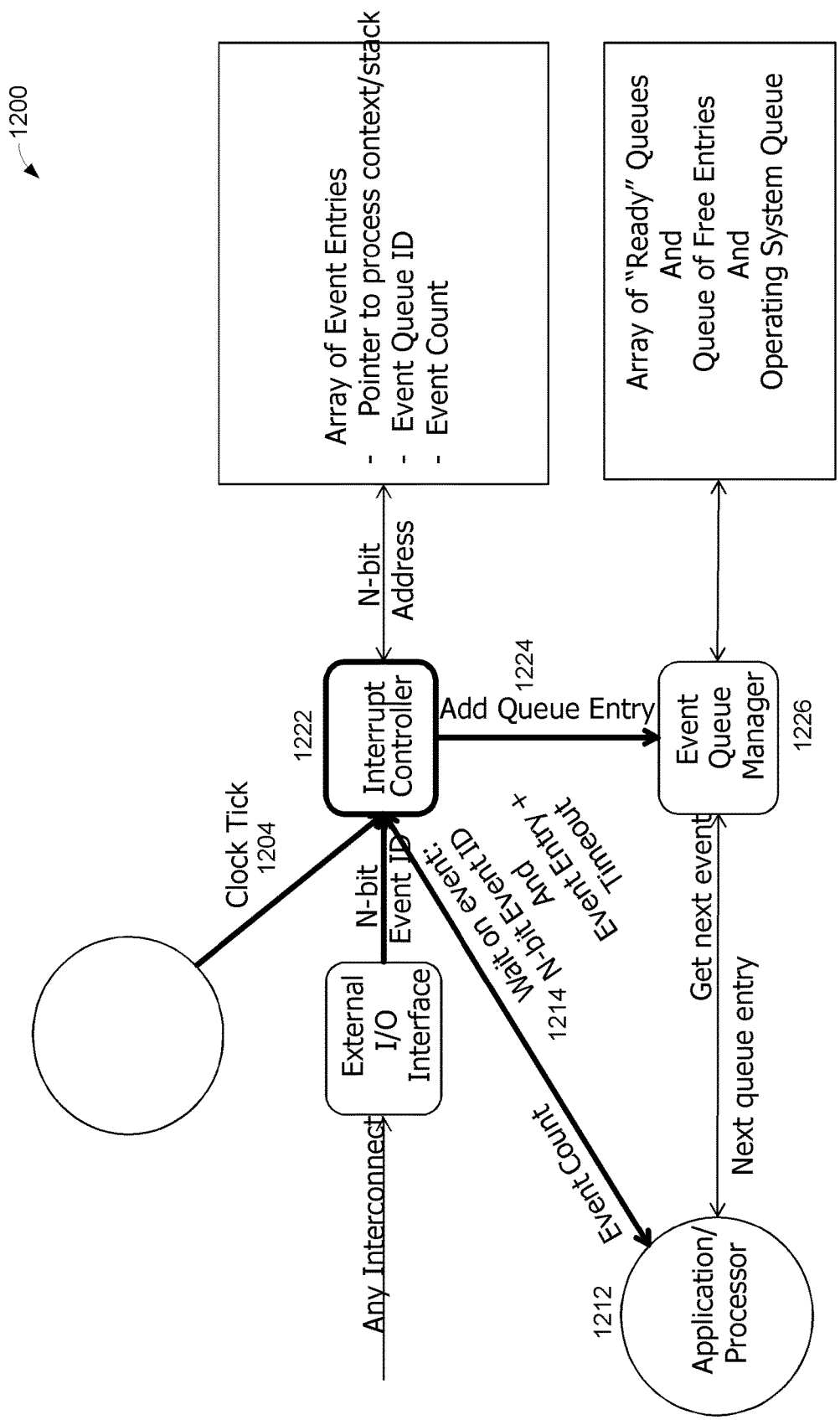
FIG. 12 illustrates one embodiment of the invention detailing Interrupt Controller operation during timeouts.

FIG. 12 illustrates, generally at 1200, one embodiment of the invention similar to FIG. 11, however detailing Interrupt Controller 1222 operation during timeouts. At 1204 is Clock Tick, at 1212 an Application/Processor, at 1214 Wait on event: N-bit Event ID And Event Entry+Timeout, at 1222 Interrupt Controller, at 1224 Add Queue Entry, and at 1226 Event Queue Manager. In this embodiment there are 3 basic procedures the Interrupt Controller 1222 needs to perform, they are: 1) handling the Clock Tick, 2) Event Handling, and 3) Process Wait for Event. These procedures are detailed below.

"Clock Tick" is:
(a) Increment time
(b) Suspend "Wait for Event" processing
(c) While head of timeout queue has timed out
(c1) Clear associated event entry, if it exists
(c2) Send event entry to Event Queue Manager
(d) Resume "Wait for Event" processing.

"Event Handling" is:
(a) Suspend "Wait for Event" processing
(b) Accept event ID, read event entry
(c) If software is waiting for event entry, then
(c1) Clear event entry and Timeout Queue Entry
(c2) Send event entry to Event Queue Manager
(d) If software is not waiting for event entry, then
(d1) Count events
(d2) Increment event entry count
(e) Otherwise, discard event, and
(f) Resume "Wait for Event" processing.

Process "Wait for Event" is:
(a) If event count >0 then:
(a1) Return event entry
(b) If event count==0 then:
(b1) Pause Event Handling
(b2) Save state to memory
(b3) Write event entry,
(b4) Add event to Timeout Queue, and
(b4) Resume Event Handling While one embodiment of "Clock Tick", "Event Handling", and "Wait for Event" have been illustrated, the invention is not so limited and other embodiments are possible, for example, but not limited to, prioritizing clock ticks, not counting events for event handling, and not handling if event count >0 for wait for events.

Wait for Event List

Figure 13:
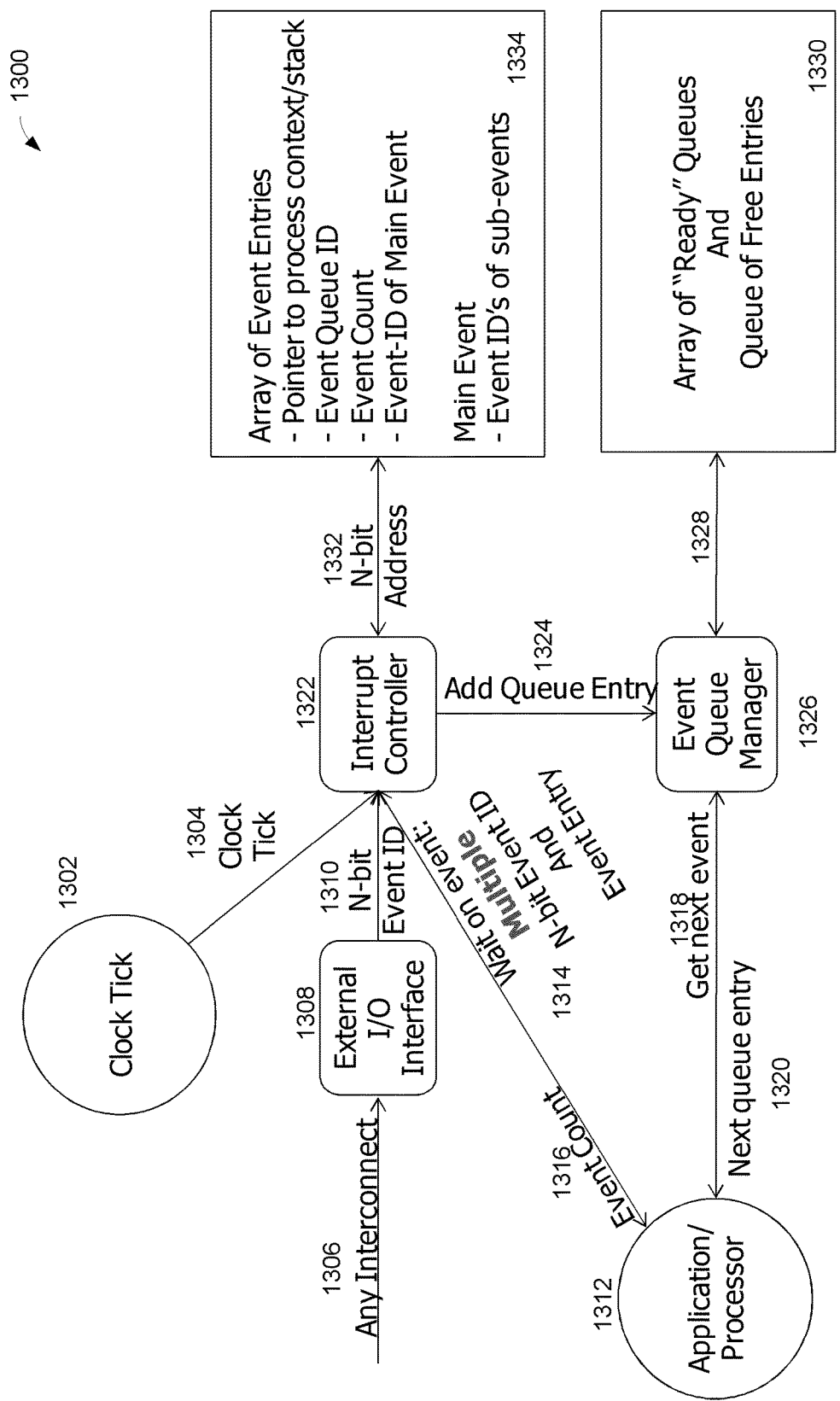
FIG. 13 illustrates one embodiment of the invention showing wait for event list for a clock tick.

FIG. 13 illustrates, generally at 1300, one embodiment of the invention showing wait for event list for a clock tick. At 1302 is a generating source Clock Tick, at 1304 is Clock Tick event that is communicated to Interrupt Controller 1322. At 1306 is Any Interconnect which goes to an External I/O Interface 1308, which generates an N-bit Event ID 1310 that is communicated to Interrupt Controller 1322. At 1312 is an Application/Processor. When Application/Processor 1312 is sending (i.e. initiating) a communication to the Interrupt Controller 1322 it is as denoted at 1314 Wait on Multiple event: N-bit Event ID And Event Entry. When Application/Processor 1312 is receiving a communication from the Interrupt Controller 1322 it is denoted at 1316 and is an Event Count. That is the Interrupt Controller 1322 can communicate to the Application/Processor 1312 an Event Count 1316. Application/Processor 1312 can also communicate to Event Queue Manager 1326 a Get next event 1318. Similarly, Event Queue Manager 1326 can communicate to Application/Processor 1312 a Next queue entry 1320. Interrupt Controller 1322 can communicate to Event Queue Manager 1326 an Add Queue Entry 1324. Interrupt Controller 1322 is in communication via an N-bit Address 1332 with an Array of Event Entries and Main Event 1334. The Array of Event Entries and Main Event 1334 includes for example under Array of Event Entries, a Pointer to process context/stack, an Event Queue ID, an Event Count, and a Event-ID of Main Event, and under Main Event it includes for example Event IDs of sub-events. Event Queue Manager 1326 is in communication via 1328 with block 1330 which includes an Array of "Ready" Queues And Queue of Free Entries.

In one embodiment of the invention, for example, as shown in FIG. 13, software may need to wait for any one of a list of events. That is the software may take the approach of "wake me whenever any of these sockets has something for me."

Interrupt Controller Operation: Event List—Do Everything in Hardware

Figure 14:
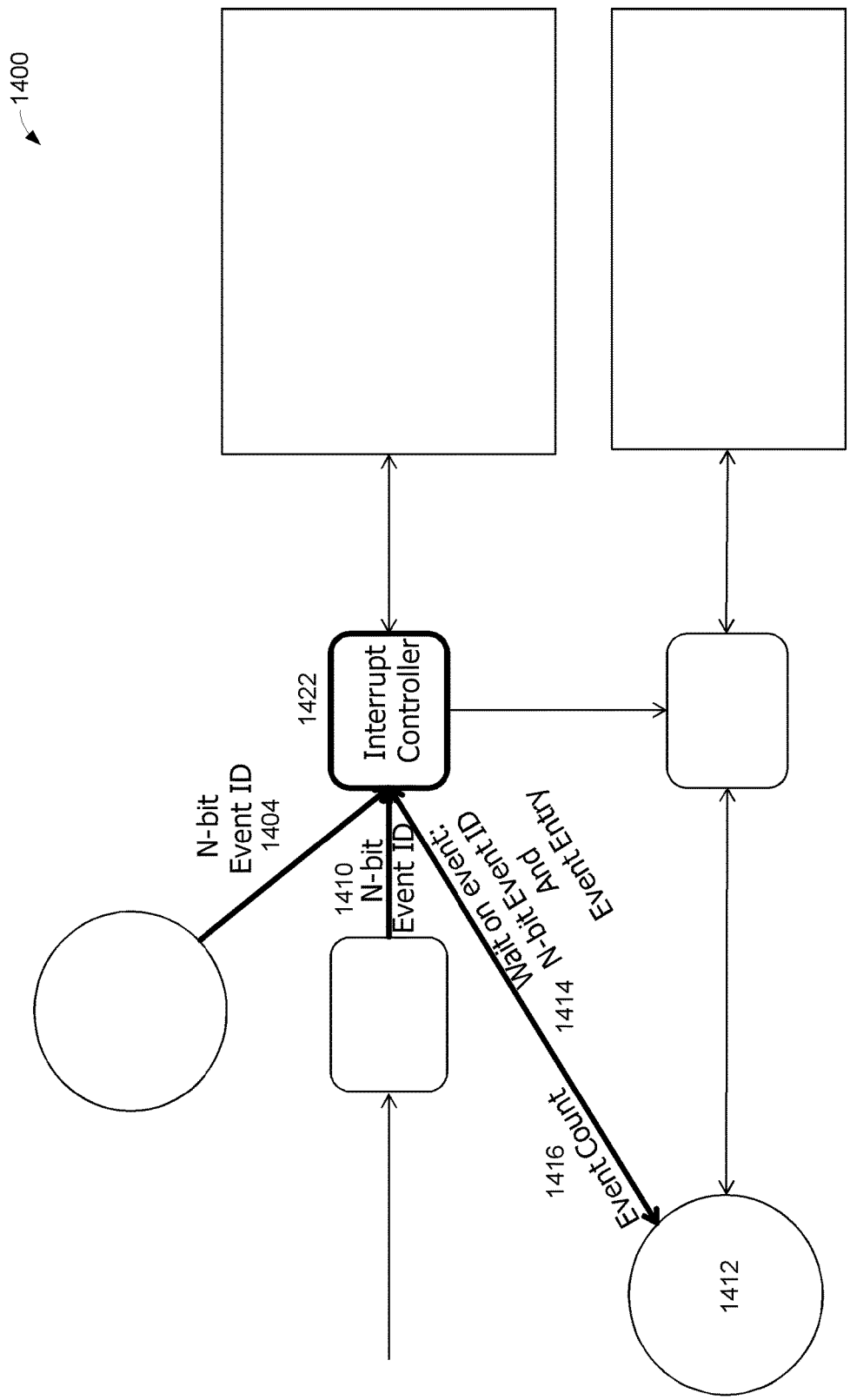
FIG. 14 illustrates one embodiment of the invention wherein the interrupt controller handles the event list doing everything in hardware.

FIG. 14 illustrates, generally at 1400, one embodiment of the invention wherein the interrupt controller handles the event list doing everything in hardware. At 1404 is an N-bit Event ID, at 1412 an Application/Processor, at 1414 Wait on event: N-bit Event ID And Event Entry, at 1416 Event Count, and at 1422 Interrupt Controller. In this embodiment, the Interrupt Controller 1422 has several operations to perform, they are 1) "Event Handling", and 2) process "Wait for Event List".

"Event Handling" is:
(a) Suspend "Wait for Event" processing
(b) Accept event ID, read event entry
(c) If software is waiting for Event Entry, then
(c1) Clear associated Event List entries
(c2) Send Event Entry to Event Queue Manager
(d) If software is not waiting for Event Entry, then
(d1) Count events
(d2) Increment Event Entry count
(e) Otherwise, discard event, and
(f) Resume "Wait for Event" processing Process "Wait for Event" is:
For each Event List entry:
(a) If event count >0 then Return event entry
(b) If event count >0 then Clear event count
(c) If event count==0 then:
(c1) Pause Event Handling
(c2) Save state to memory
(c3) Write event entry
(c4) Link event entry to Main Event
(c5) Resume Event Handling In one embodiment of the invention steps (a) and (b) of Wait for Event directly above are optional.

Interrupt Controller Operation: Event List—Manage List in Software

Figure 15:
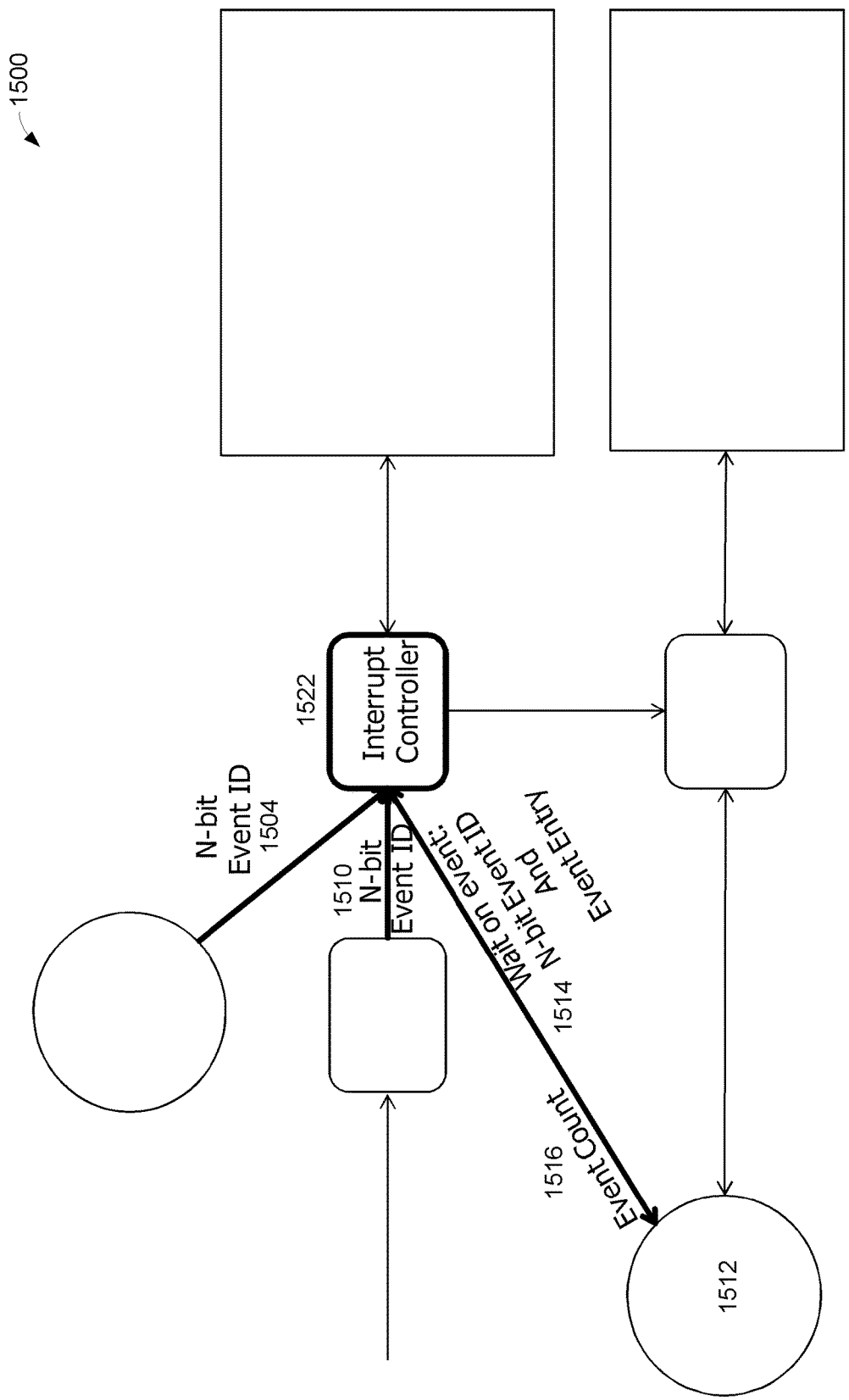
FIG. 15 illustrates one embodiment of the invention wherein there is no change in the hardware, however software processes the event entry.

FIG. 15 illustrates, generally at 1500, one embodiment of the invention wherein there is no change in the hardware (e.g. FIG. 14), however software processes the event entry. At 1504 is an N-bit Event ID, at 1512 an Application/Processor, at 1514 Wait on event: N-bit Event ID And Event Entry, at 1516 Event Count, and at 1522 Interrupt Controller.

In this embodiment, software on a processor handles the events, and the Interrupt Controller 1522 has handles process "Wait for Event List".

"Event Handling" is done in software. There is no change needed in the hardware and when software processes the event entry, it may chose to "invalidate" the other entries in the Event List. In one embodiment "Invalidate" could be another Software to Interrupt Controller transaction.

Process "Wait for Event List" is:
For each Event List entry:
 (a) If event count >0 then Return event entry
 (b) If event count >0 then Clear event count
 (c) If event count==0 then:
 (c1) Pause Event Handling
 (c2) Save state to memory, and
 (c5) Resume Event Handling In one embodiment of the invention steps (a) and (b) of Wait for Event directly above are optional.

Figure 16:
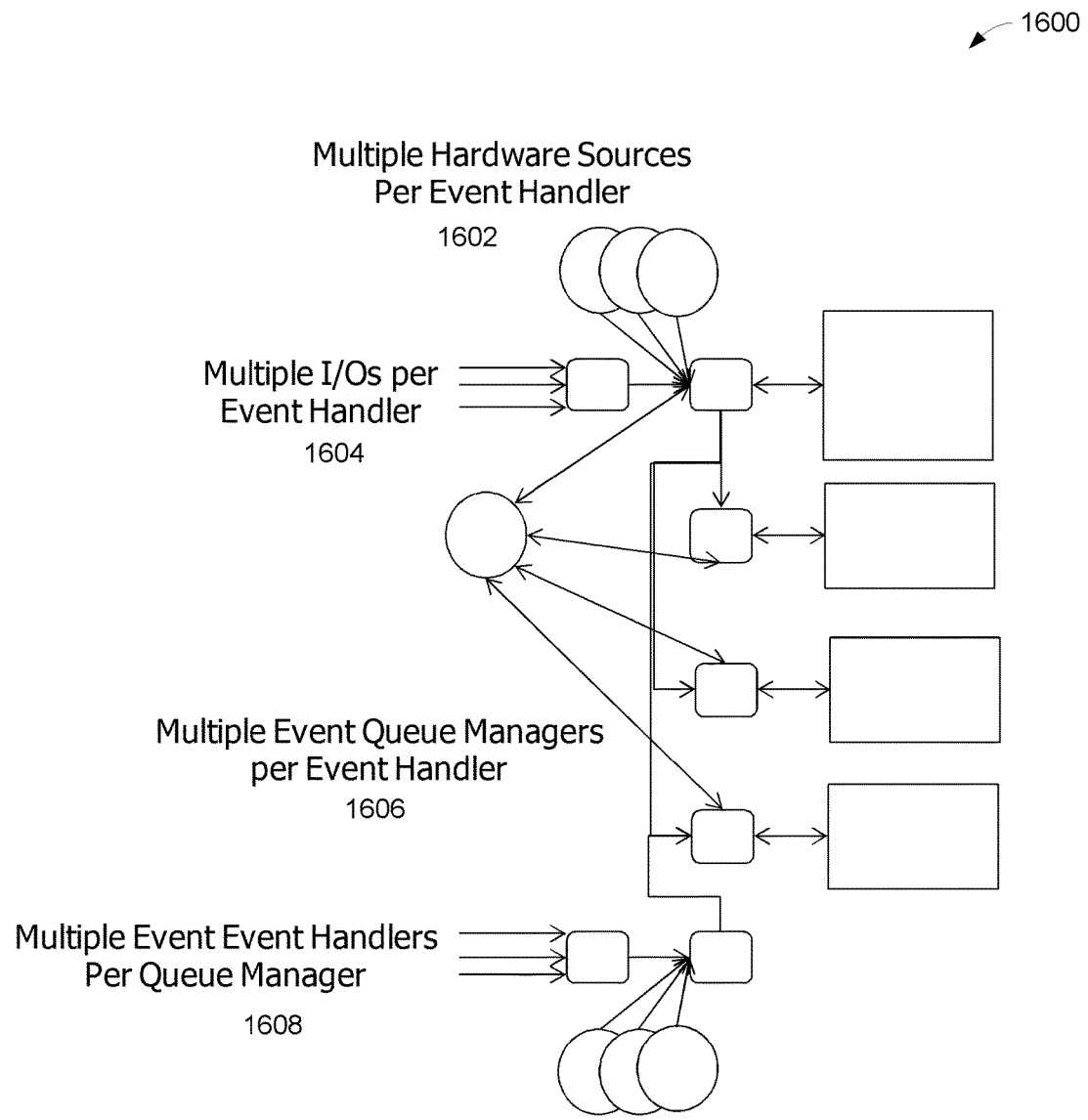
FIG. 16 illustrates one embodiment of the invention showing a mix and match virtualization topology.

FIG. 16 illustrates, generally at 1600, one embodiment of the invention showing a mix and match virtualization topology. At 1602 are Multiple Hardware Sources Per Event Handler, at 1604 Multiple I/Os per Event Handler, at 1606 Multiple Event Queue Managers per Event Handler, and at 1608 Multiple Event Handlers Per Queue Manager. What is to be appreciated is that the techniques disclosed can be used in a variety of configurations and there is support for virtualization.

Figure 17:
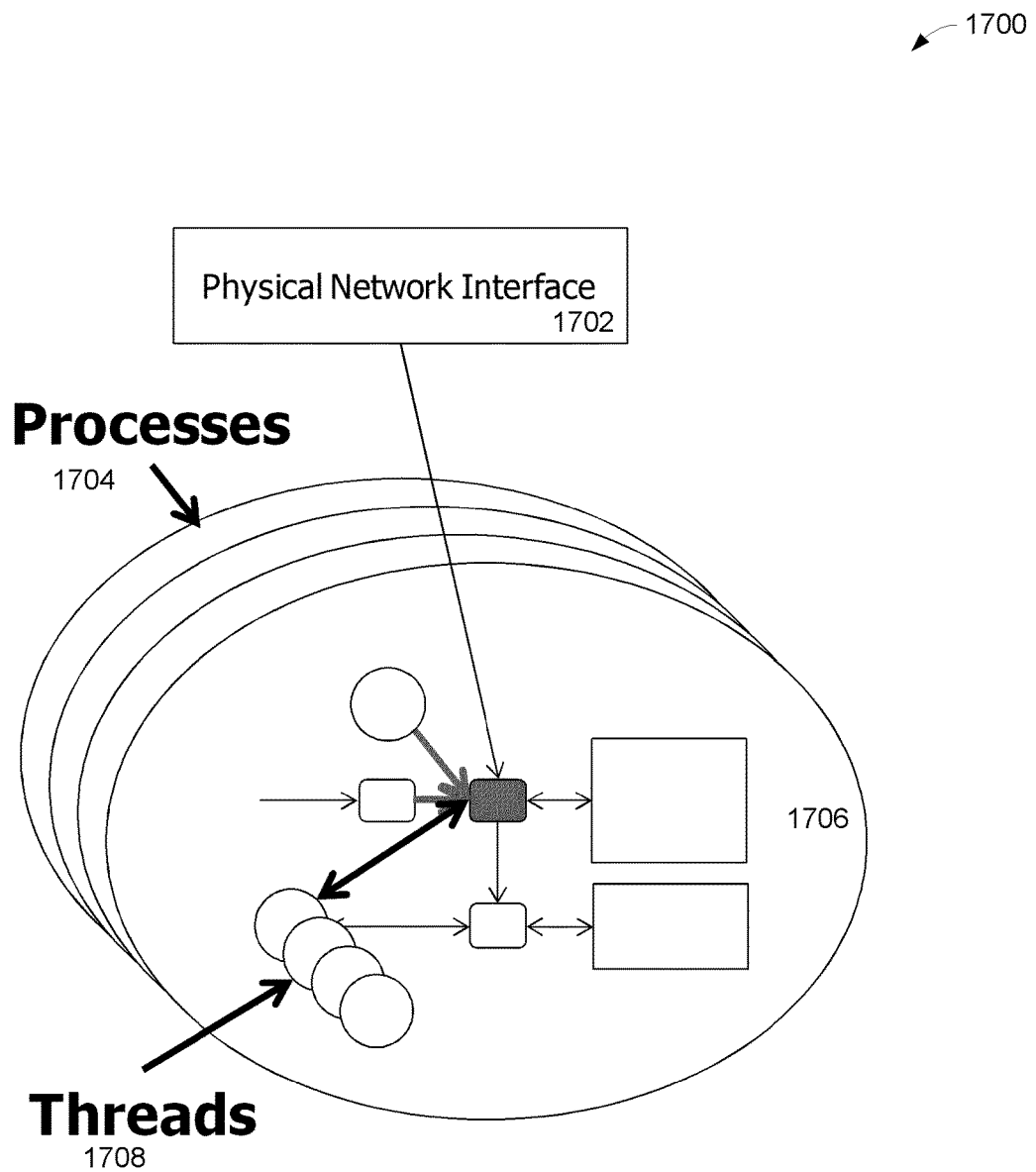
FIG. 17 illustrates one embodiment of the invention showing a virtualization example.

FIG. 17 illustrates, generally at 1700, one embodiment of the invention showing a virtualization example. At 1702 is a Physical Network Interface into an exemplary process 1706, of which there are multiple Processes 1704, and multiple Threads 1708 in 1706.

In one embodiment, for example, as illustrated in FIG. 17, each process (exemplified by 1706) has its own interrupt controller and event queue manager. A Physical network interface 1702 steers messages/events to virtual interrupt controllers. Threads within processes (exemplified by 1708 and 1706) use event queue manager/interrupt controller for inter-thread communication, timeouts, and event handling. This model applies directly to many High Performance Compute execution models, where processes are bound to a particular processor.

Figure 18:
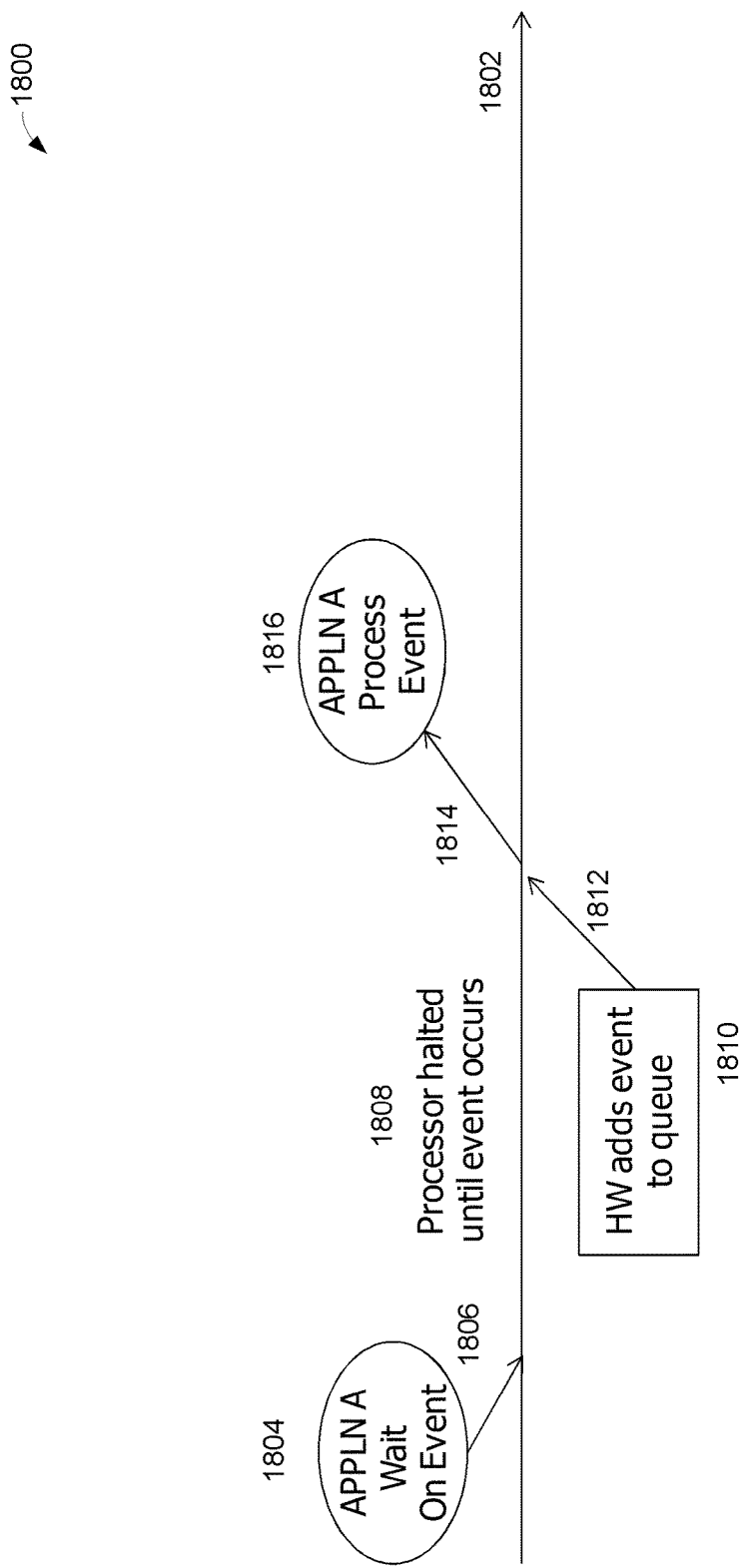
FIG. 18 illustrates one embodiment of the invention showing Power Efficient Processing.

FIG. 18 illustrates, generally at 1800, one embodiment of the invention showing Power Efficient Processing. At 1802 is shown a timeline of an event queue. At 1804 application A needs to wait on an event and signals this via 1806. The event is not ready and so the Processor is halted until the event occurs 1808. At 1810 the hardware (HW) adds the event to the queue via 1812 and immediately the processor is started and via 1814 the event is passed to application A to process the event 1816.

In one embodiment of the invention, for example, as shown in FIG. 18, in an extreme case, all software on a processor is responsible for processing events.

In one embodiment of the invention, for example, as shown in FIG. 18, if no events are available, halt the processor until an event occurs.

In one embodiment of the invention, for example, as shown in FIG. 18, this approach is useful for massively parallel machines (i.e. GPUs) and/or High Performance Compute machines.

In one embodiment of the invention the interrupt controller, the array of event entries, the event queue manager, the array of queues, and interconnections therein are integrated on an integrated circuit having a processor whose instruction set has been extended by adding any combination of WNE, HANDOFF, and HANDOFF and WNE.

In one embodiment of the invention when the events are passed in hardware, the processor's state is saved. That is the processor's on-chip registers it uses for program execution are stored as are the processor's stack, and the processor's program counter.

Figure 19:
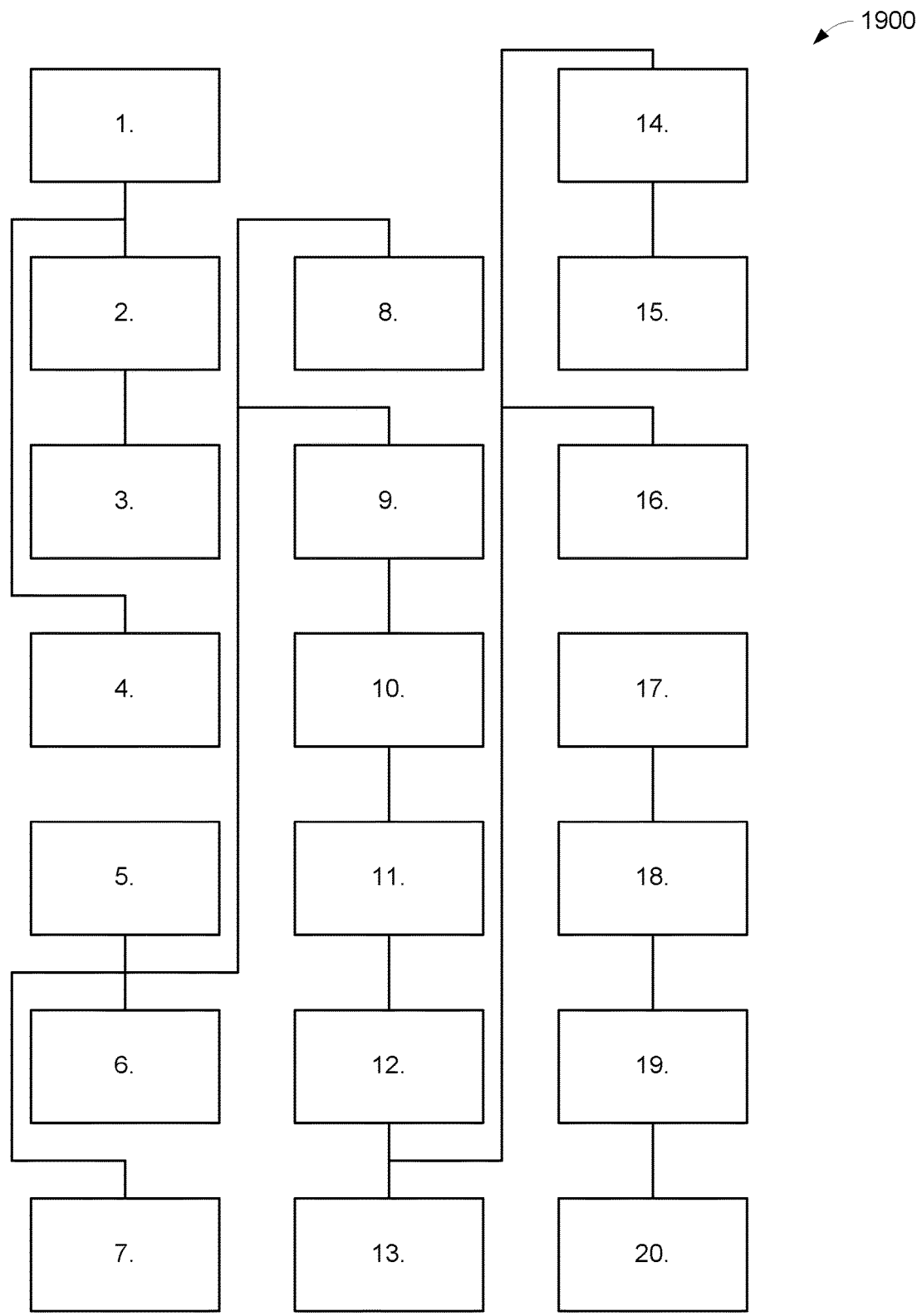
FIG. 19 illustrates various embodiments of the invention.

FIG. 19 illustrates, generally at 1900, various embodiments of the invention.

At 1. A method for handling event processing in hardware comprising:
 integrating a hardware based interrupt controller on an integrated circuit having a processor; integrating a hardware based event queue manager on said integrated circuit having said processor; integrating a hardware based interrupt memory array on said integrated circuit having said processor; integrating one or more hardware based event queue manager queues on said integrated circuit having said processor; connecting said hardware based interrupt controller to said hardware based event queue manager;
 connecting said hardware based interrupt controller to said hardware based interrupt memory array; connecting said hardware based interrupt controller to said one or more hardware based event queue manager queues; and adding to said processor a Wait for Next Event instruction.

At 2. The method of claim 1 further comprising adding to said processor a HANDOFF instruction.

At 3. The method of claim 2 further comprising adding to said processor a HANDOFF Wait for Next Event instruction.

At 4. The method of claim 1 further comprising adding to said processor a HANDOFF Wait for Next Event instruction.

At 5. A method comprising: receiving from a source an N-bit Event ID at an interrupt controller; using said interrupt controller to address an N-bit address into an array of event entries; sending from said interrupt controller an add query entry to an event queue manager; using said event queue manager to access an array of ready queues; and wherein said receiving from said source, said using said interrupt controller, said sending from said interrupt controller, and said using said event queue manager are all done in hardware without using an operating system.

At 6. The method of claim 5 wherein said source is a source from hardware.

At 7. The method of claim 5 wherein said source is a source from software.

At 8. The method of claim 5 wherein said source is from an external input/output interface.

At 9. The method of claim 5 further comprising sending from said interrupt controller an event count to an application.

At 10. The method of claim 9 further comprising sending from said interrupt controller an event count to a processor.

At 11. The method of claim 10 further comprising sending from said processor to said interrupt controller a Wait on event: N-bit Event ID and Event Entry.

At 12. The method of claim 11 further comprising integrating said interrupt controller and said event queue manager on a same integrated circuit as said processor.

At 13. The method of claim 12 wherein a Wait for Next Event (WNE) instruction is added to an instruction set of said processor.

At 14. The method of claim 12 wherein said processor has a HANDOFF instruction added to an instruction set of said processor.

At 15. The method of claim 14 wherein said processor has a HANDOFF WNE instruction added to an instruction set of said processor.

At 16. The method of claim 13 wherein when said processor executes said WNE instruction it causes said interrupt controller to query for a Next Event and if said Next Event is pending the interrupt controller returns a state of said Next Event in registers of said processor, and if said Next Event is not pending then said interrupt controller saves a process state of said processor.

At 17. An apparatus on an integrated circuit having a processor, the apparatus comprising: an interrupt controller, said interrupt controller in operative communication with said processor; operating system queues, said operating system queues in direct operative communication with only said interrupt controller; and extensions to an instruction set of said processor; said extensions for passing events in hardware, wherein said processor when executing said extensions communicates to said interrupt controller.

At 18. The apparatus of claim 17 further comprising an event queue manager, said event queue manager in operative communication with said interrupt controller and an array of hardware based queues.

At 19. The apparatus of claim 18 wherein said event queue manager is in operative communication with said processor.

At 20. The apparatus of claim 19 wherein said processor does not have direct access to said array of hardware based queues.

Thus Low Latency Interconnect Integrated Event Handling has been described.

Because of the high speed embodiments the present invention requires specialized hardware.

For example, specialized hardware is needed for the interrupt control and event queue manager. For example, but not limited to specialized hardware in the form of a 4-bit or larger barrel shifter.

As used in this description "GPU" or similar phrases, such as "Graphics Processing Unit" refers to specialized hardware that is not to be confused with a CPU (central processing unit). One skilled in the art understands that a GPU and CPU are different. For example, but not limited to, a GPU generally has specialized hardware for the efficient processing of pixels and polygons (image processing).

As used in this description "host processor" or "processor" or similar phrases refers to a general purpose CPU and not a GPU.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus Low Latency Interconnect Integrated Event Handling has been described.

What is claimed is:

1. A method comprising:
receiving from a source an N-bit Event ID at an interrupt controller;
using said interrupt controller to address an N-bit address into an array of event entries;
sending from said interrupt controller an add query entry to an event queue manager;
using said event queue manager to access an array of ready queues; and
wherein said receiving from said source, said using said interrupt controller, said sending from said interrupt controller, and said using said event queue manager are all done in hardware without using an operating system.

2. The method of claim 1 wherein said source is a source from hardware.

3. The method of claim 1 wherein said source is a source from software.

4. The method of claim 1 wherein said source is from an external input/output interface.

5. The method of claim 1 further comprising sending from said interrupt controller an event count to an application.

6. The method of claim 5 further comprising sending from said interrupt controller an event count to a processor.

7. The method of claim 6 further comprising sending from said processor to said interrupt controller a Wait on event: N-bit Event ID and Event Entry.

8. The method of claim 7 further comprising integrating said interrupt controller and said event queue manager on a same integrated circuit as said processor.

9. The method of claim 8 wherein a Wait for Next Event (WNE) instruction is added to an instruction set of said processor.

10. The method of claim 9 wherein when said processor executes said WNE instruction it causes said interrupt controller to query for a Next Event and if said Next Event is pending the interrupt controller returns a state of said Next Event in registers of said processor, and if said Next Event is not pending then said interrupt controller saves a process state of said processor.

11. The method of claim 8 wherein said processor has a HANDOFF instruction added to an instruction set of said processor.

12. The method of claim 11 wherein said processor has a HANDOFF WNE instruction added to an instruction set of said processor.

* * * * *